United States Patent [19]

Kawabata

[11] Patent Number: 5,302,814
[45] Date of Patent: Apr. 12, 1994

[54] BAR CODE READING APPARATUS
[75] Inventor: Tatsuro Kawabata, Kawasaki, Japan
[73] Assignee: Fujitsu Limited, Kanagawa, Japan
[21] Appl. No.: 994,451
[22] Filed: Dec. 21, 1992

Related U.S. Application Data
[63] Continuation of Ser. No. 714,902, Jun. 17, 1991, abandoned.

[30] Foreign Application Priority Data
Jun. 18, 1990 [JP] Japan .................. 2-159196
[51] Int. Cl.⁵ .............................. G06K 7/10
[52] U.S. Cl. ......................... 235/463; 235/436; 235/466
[58] Field of Search ............... 235/436, 466, 463, 474

[56] References Cited
U.S. PATENT DOCUMENTS
4,147,295 4/1979 Nojiri et al. .
4,578,570 3/1986 Mazumber ................... 235/463

FOREIGN PATENT DOCUMENTS
55-5582 1/1980 Japan .
59-84522 5/1984 Japan .
63-196990 8/1988 Japan .

Primary Examiner—Harold Pitts
Attorney, Agent, or Firm—Armstrong, Westerman, Hattori, McLeland & Naughton

[57] ABSTRACT

A bar code reading apparatus includes a light source for illuminating a bar code, a light receiving part for receiving reflected light from the bar code and for subjecting the received reflected light to a photoelectric conversion to output an electrical signal, and a decoding part for decoding the bar code by reading width data related to widths of the bars and spaces of the bar code based on the electrical signal from the light receiving part. The decoding part includes a sampling part for sampling the electrical signal from the light receiving part with a predetermined period and for outputting sampled data, a calculating part for calculating an average value of the sampled data for every predetermined interval, where the predetermined interval is greater than a maximum width of a noise which is detectable from the electrical signal, and an operation part for obtaining intersecting points where a waveform connecting the sampled data and a waveform connecting the average values intersect and for reading a width of each bar and space within the bar code based on an interval between each two adjacent intersecting points.

6 Claims, 13 Drawing Sheets

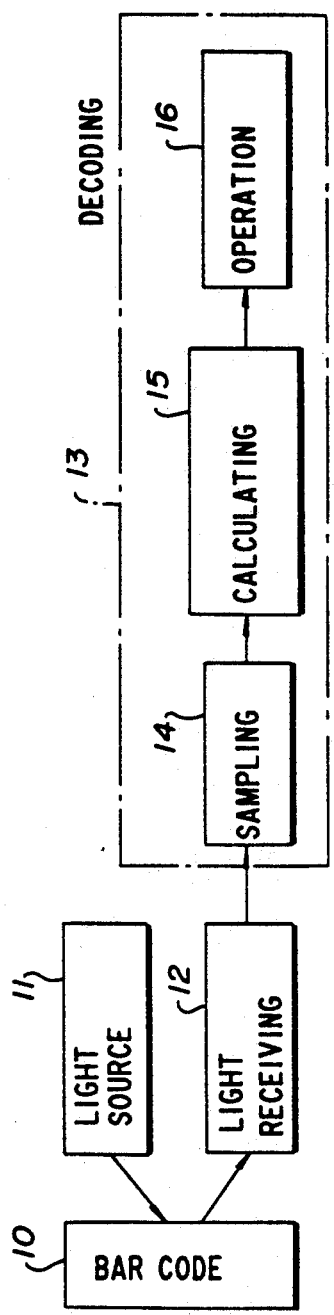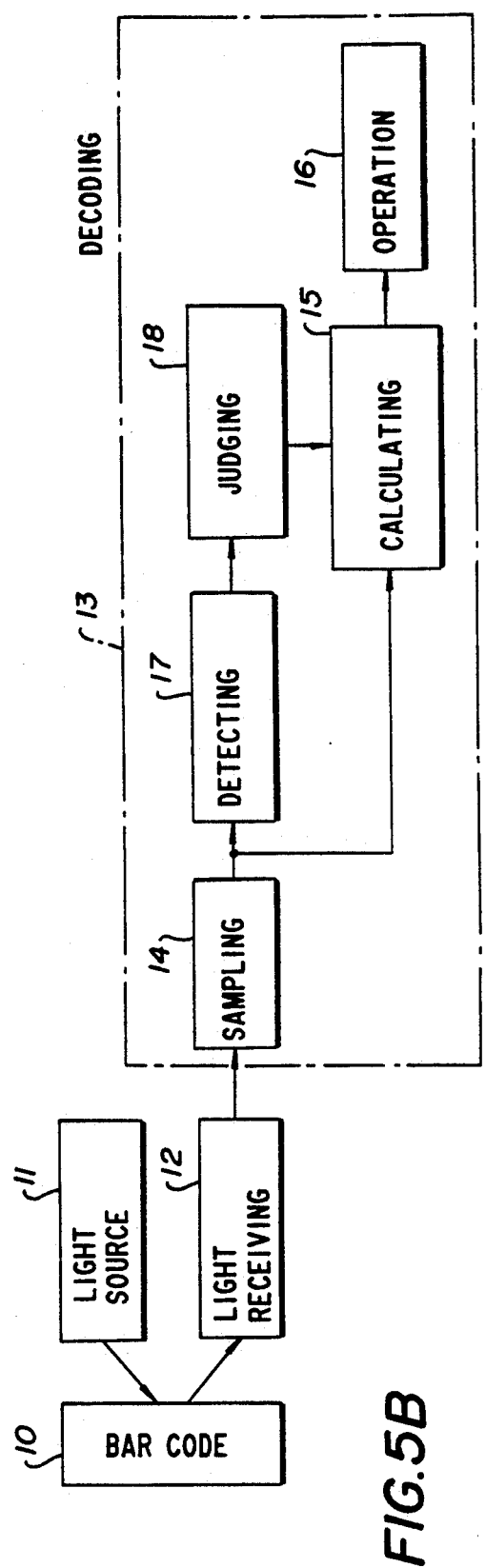
FIG.5A
FIG.5B

BAR CODE READING APPARATUS

This application is a continuation of application Ser. No. 07/714,902 filed Jun. 17, 1991, now abandoned.

BACKGROUND OF THE INVENTION

The present invention generally relates to bar code reading apparatuses, and more particularly to a bar code reading apparatus which reads a bar code by using light reflected from the bar code.

Recently, management systems for goods using bar codes are popularly employed. For this reason, the bar code is not necessarily printed on paper and the bar code is in many cases printed on the product itself. When the bar code is printed on the product itself, the reflectivity of the background part of the bar code depends on each product. Hence, the signal-to-noise (S/N) ratio of the bar code part and the background part becomes poor depending on the reflectivity of the background part. The bar code cannot be read correctly if the S/N ratio of the bar code part and the background part is poor, and there is a demand to accurately read the bar code regardless of the reflectivity of the background part.

The reflectivity of the background part differs depending on the product for the following reasons. First, the state of the background part such as the material, color and surface roughness is different for each product. Hence, even though a white coating usually covers the background part of the product where the bar code is printed, the reflectivity of the background part is still different for each product. Second, when dirt or the like adheres on the background part or the background part is scratched while the product is transported, the dirt or scratch appears as noise when the bar code is detected. As a result, the reflectivity of the background part may be different among the products of the same kind and may vary within the same bar code. Third, the printing of the bar code cannot be controlled perfectly so that the printed bar codes on the products of the same kind are identical. In other words, some printed bar codes may inevitably be darker than others or vice versa. Therefore, the reflectivity of the background part may be different even among the products of the same kind.

Generally, the bar code reading apparatus includes a light source for illuminating the bar code, a light receiving part for receiving reflected light from the bar code, a shaping circuit for shaping an electrical signal which is obtained by a photoelectric conversion in the light receiving part, and a decoding circuit for decoding the bar code from a shaped signal which is output from the shaping circuit.

Various methods of decoding the bar code in the decoding circuit have been proposed. For example, a first method slices an average value as shown in FIG. 1, and a second method detects middle points as shown in FIG. 2.

According to the first method shown in FIG. 1, an average of all waveforms of a signal I which has been smoothened in the shaping circuit in order to eliminate noise is obtained so as to determine a reference voltage. The waveforms of the signal I correspond to the bars of the bar code. The signal I is then sliced by this reference voltage, and the bar code is read by detecting widths a through i of the bar code at the sliced part.

As a modification of this first method, there is a method which uses a plurality of reference voltages. In this case, each waveform is sliced at the plurality of reference voltages to detect widths for the same waveform, and an average of the detected widths is regarded as the detected width for this waveform. However, this modification of the first method requires a relatively long processing time because of the use of the plurality of reference voltages.

On the other hand, according to the second method shown in FIG. 2 obtains a middle point between adjacent peaks and valleys of the waveform of a smoothened signal II which is output from the shaping circuit. This middle point is used as a reference value, and a point indicated by a white circular mark in FIG. 2 where the waveform crosses the reference value is found. The bar code is read by detecting widths a through k between each two adjacent points indicated by the white circle. A maximum inclination of the waveform may be taken into consideration.

However, according to the first method described above, the reference voltage is constant. For this reason, when the reflectivity of the background part of the bar code greatly varies as shown in FIG. 3(A), the detection signal (waveform data) III corresponding to the detected bar code becomes as shown in FIG. 3(B). As shown in FIG. 3(B), the peaks of the detection signal III greatly differ and the valleys of the detection signal III also greatly differ. In addition, a noise N may be included in the detection signal III. As a result, even if the constant reference voltage is set to one of the voltages V1, V2 and V3 shown in FIG. 3(B), it is impossible to read the bar code accurately.

In the case of the second method shown in FIG. 2, the peaks and valleys of the noise part of the waveform are also detected because the smoothened signal output from the shaping circuit still includes noise which cannot be eliminated by the smoothing. As a result, the noise part causes inaccurate reading of the bar code. For example, the bar code pattern may include a defective part 2 shown in FIG. 4(A) where the reflectivity is different from other parts of the bar code. This defective part 2 may be caused by dirt on the bar code pattern or a printing error when the bar code pattern is printed. In this case, the peak and valley are also found in a bar code detection signal (waveform data) 3 at a part 3 shown in FIG. 4(B), and it is impossible to read the bar code accurately.

SUMMARY OF THE INVENTION

Accordingly, it is a general object of the present invention to provide a novel and useful bar code reading apparatus in which the problems described above are eliminated.

Another and more specific object of the present invention is to provide a bar code reading apparatus comprising a light source for illuminating a bar code, the bar code including a combination of bars and spaces, light receiving means, including means for receiving reflected light from the bar code and means for subjecting the received reflected light to a photoelectric conversion to output an electrical signal, and decoding means, coupled to the light receiving means, for decoding the bar code by reading width data related to widths of the bars and spaces of the bar code based on the electrical signal from the light receiving means. The decoding means includes sampling means, coupled to the light receiving means, for sampling the electrical signal from the light receiving means with a predetermined period and for outputting sampled data, calculating means, coupled to the sampling means, for calculating an average value of the sampled data for every predetermined interval, the predetermined interval being greater than a maximum width of a noise which is detectable from the electrical signal, and operation means, coupled to the calculating means, for obtaining intersecting points where a waveform connecting the sampled data and a waveform connecting the average values intersect, and for reading a width of each bar and space within the bar code based on an interval between each two adjacent intersecting points. According to the bar code reading apparatus of the present invention, it is possible to accurately read and decode the bar code even if the reflectivity of the background part of the bar code greatly varies for some reason.

Still another object of the present invention is to provide the bar code reading apparatus of the type described above, wherein the decoding means further includes detecting means, coupled to the sampling means, for calculating an average value of all of the sampled data from the sampling means as a reference value and for detecting the width of each bar and space within the bar code based on an interval between two adjacent sampled data which match the reference value, and judging means, coupled to the detecting means, for judging whether or not correct conversion of the widths detected by the detecting means into character information is possible, the judging means activating the calculating means only when a correct conversion of the widths into the character information is impossible. According to the bar code reading apparatus of the present invention, it is possible to read and decode the bar code at a high speed regardless of whether or not the reflectivity of the background part of the bar code greatly varies.

Other objects and further features of the present invention will be apparent from the following detailed description when read in conjunction with the accompanying drawings.

BRIEF DESCRIPTION OF THE DRAWINGS

FIGS. 5A and 5B are system block diagrams for explaining the operating principle of a bar code reading apparatus according to the present invention;

FIG. 13 is a time chart for explaining relationships of the trigger signal and the bar code detection signal;

DESCRIPTION OF THE PREFERRED EMBODIMENTS

Figure 1:
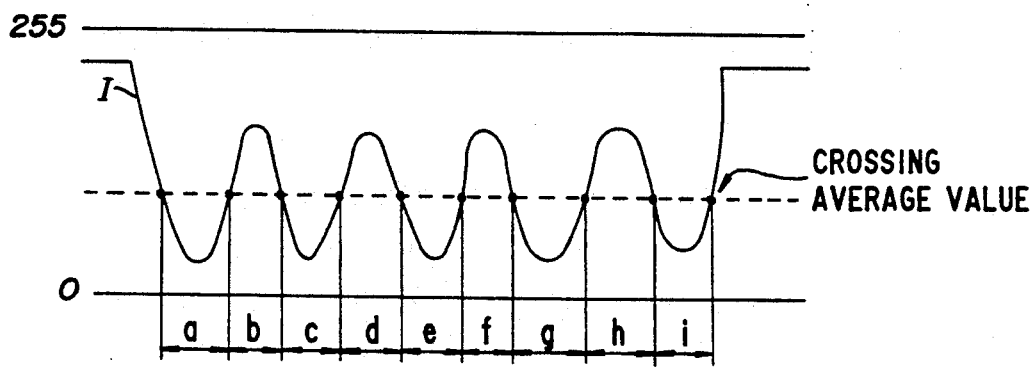
FIG. 1 is a diagram for explaining a first conventional method of reading a bar code.
Figure 2:
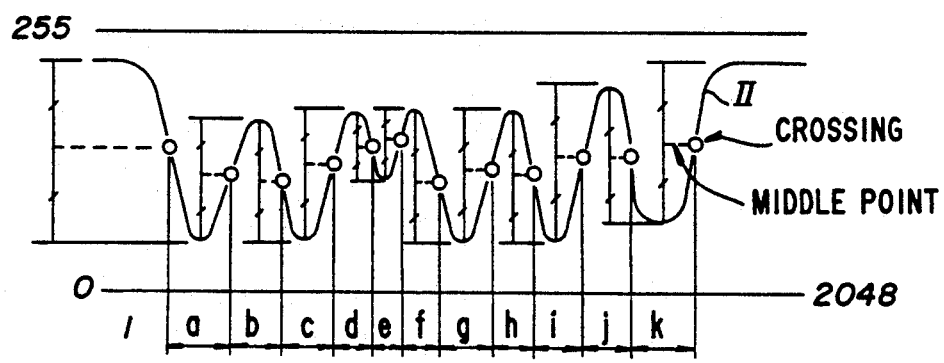
FIG. 2 is a diagram for explaining a second conventional method of reading the bar code.
Figure 3:
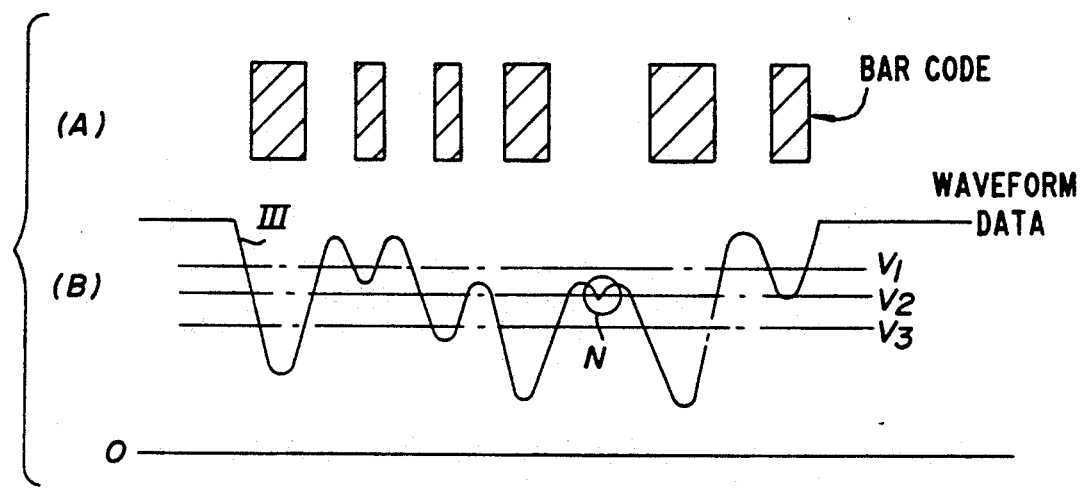
FIG. 3 is a diagram for explaining the problems of the first conventional method.
Figure 4:
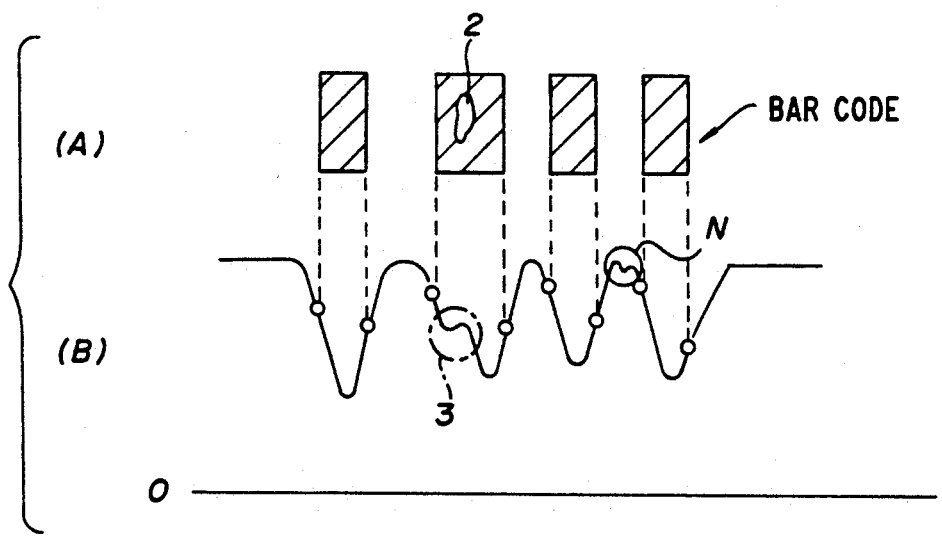
FIG. 4 is a diagram for explaining the problems of the second conventional method.

First, a description will be given of the operating principle of a bar code reading apparatus according to the present invention, by referring to FIGS. 5A and 5B.

According to one aspect of the present invention, the bar code reading apparatus includes a light source 11 for illuminating a bar code 10, a light receiving part 12 for receiving reflected light from the bar code 10, and a decoding part 13 which reads width data of the bar code 10 based on an electrical signal which is output from the light receiving part 12 by photoelectric conversion, as shown in FIG. 5A. The decoding part 13 includes a sampling part 14, an average value calculating part 15 and an operation part 16.

The sampling part 14 samples the electrical signal from the light receiving part 12 with a predetermined period. The average value calculating part 15 calculates an average value of the sampled data from the sampling part 14 for every average value calculation interval. The operation part 16 obtains crossing data related to points where a waveform connecting the average values and a waveform connecting the sampled data cross. The operation part 16 reads width data related to the bar code 10 based on intervals of adjacent crossing data.

On the other hand, according to another aspect of the present invention, the decoding part 13 additionally includes a detecting part 17 and a judging part 18 which are connected as shown in FIG. 5B. In FIG. 5B, those parts which are the same as those corresponding parts in FIG. 5A are designated by the same reference numerals, and a description thereof will be omitted. The detecting part 17 calculates an average value of all the sampled data as a reference value, and detects the width data related to the bar code 10 based on the interval of the adjacent sampled data which match the reference value. In addition, the judging part 18 converts the width data from the detecting part 17 into character data, and judges whether or not the bar code 10 is read correctly. The judging part 18 controls the average value calculating part 15 to calculate the average value only when the judging part 18 judges that the bar code 10 is not read correctly.

The bar code 10 itself is known and is generally made up of a series of black bars and spaces which are arranged in a predetermined sequence depending on the information to be described by the bar code 10. There are two kinds of black bars, namely, a wide bar and a narrow bar. Similarly, there are two kinds of spaces, namely, a wide space and a narrow space. Character information or the like is described by the combination of the wide and narrow bars and the wide and narrow spaces. The widths of the black bars and spaces are standardized.

As described above, the average value calculating part 15 calculates the average value of the sampled data for every average value calculation interval. As the average value calculation interval increases, the detection signal of the bar code 10 becomes less affected by the noise, but it becomes more difficult to read narrow widths of the bars and spaces. On the other hand, when as the average value calculation interval decreases, it becomes easier to read narrow widths of the bars and spaces, but the detection signal of the bar code 10 becomes more affected by the noise. Therefore, the average value calculation interval must be selected so that the effect of the noise on the detection signal of the bar code 10 is minimum and the narrow widths of the bars and spaces can be read with relative ease. It is known from experience that a maximum width which is detected for the noise is less than the minimum width of the bar, that is, the narrow bar. Hence, in the present invention, the average value calculation interval is set greater than the maximum width of the noise. For example, the average value calculation interval is set equal to the minimum width of the bar, that is, the narrow bar.

Figure 6A:
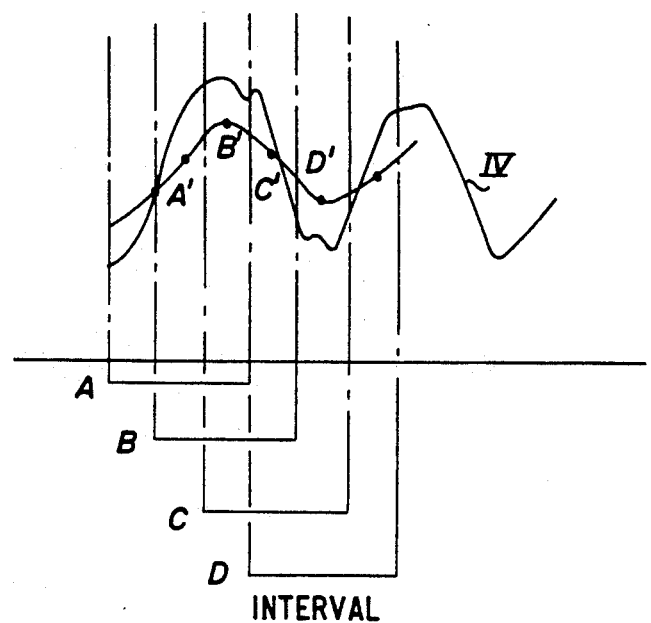
FIGS. 6A and 6B are diagrams for explaining the operating principle of the bar code reading apparatus according to the present invention.

FIG. 6A shows average value calculation intervals A, B, C and D which are respectively equal to the width of the narrow bar. A waveform IV shown in FIG. 6A connects the sampled data. The average value calculating part 15 calculates an average value A' of the sampled data within the average value calculation interval A and stores the average value A' together with an address of a center position in the average value calculation interval A. Similarly, the average value calculating part 15 successively calculates average values B', C' and D' of the sampled data within the respective average value calculation intervals B, C and D and stores the average values B', C' and D' together with center positions in the respective average value calculation intervals B, C and D.

Figure 6B:
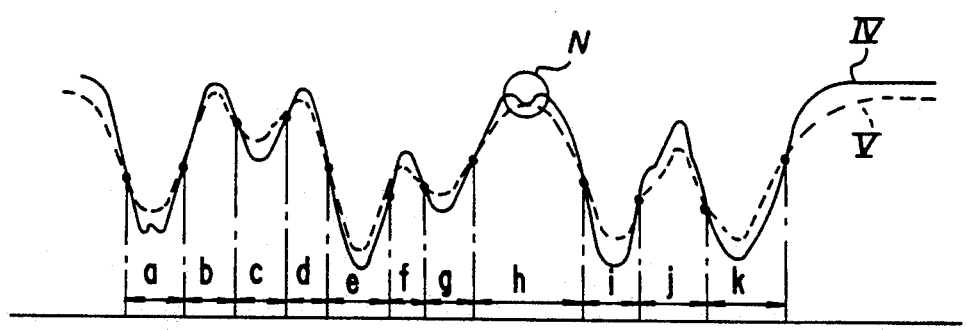

The operation part 16 obtains crossing data related to intersections of the waveform IV of the sampled data and a waveform V indicated by a dotted line in FIG. 6B which connects the average values A' through D'. In FIG. 6B, black circular marks indicate the intersections, that is, the crossing data. Next, the operation part 16 reads width data a through k shown in FIG. 6B based on an interval between each of two adjacent intersections, that is, crossing data.

Accordingly, even when the peaks and valleys are inconsistent as indicated by the solid line IV in FIGS. 6A and 6B due to the large change in the reflectivity of the background part of the bar code 10, the average value calculation interval is when compared to the first conventional method which slices the sampled data waveform at the reference voltage which is obtained by averaging the sampled data, and the undesirable effects of the inconsistent peaks and valleys are greatly reduced when compared to the second conventional method which obtains an average value of the adjacent peak and valley.

According to the other aspect of the present invention described in conjunction with FIG. 5B, the bar code 10 is first read using the first conventional method, and the method of the present invention is employed only when the bar code 10 cannot be read correctly by the first conventional method. If the reflectivity of the background part of the bar code 10 does not change greatly, the first conventional method is less affected by the noise N and requires a shorter processing time when compared to the method of the present invention.

Figure 7:
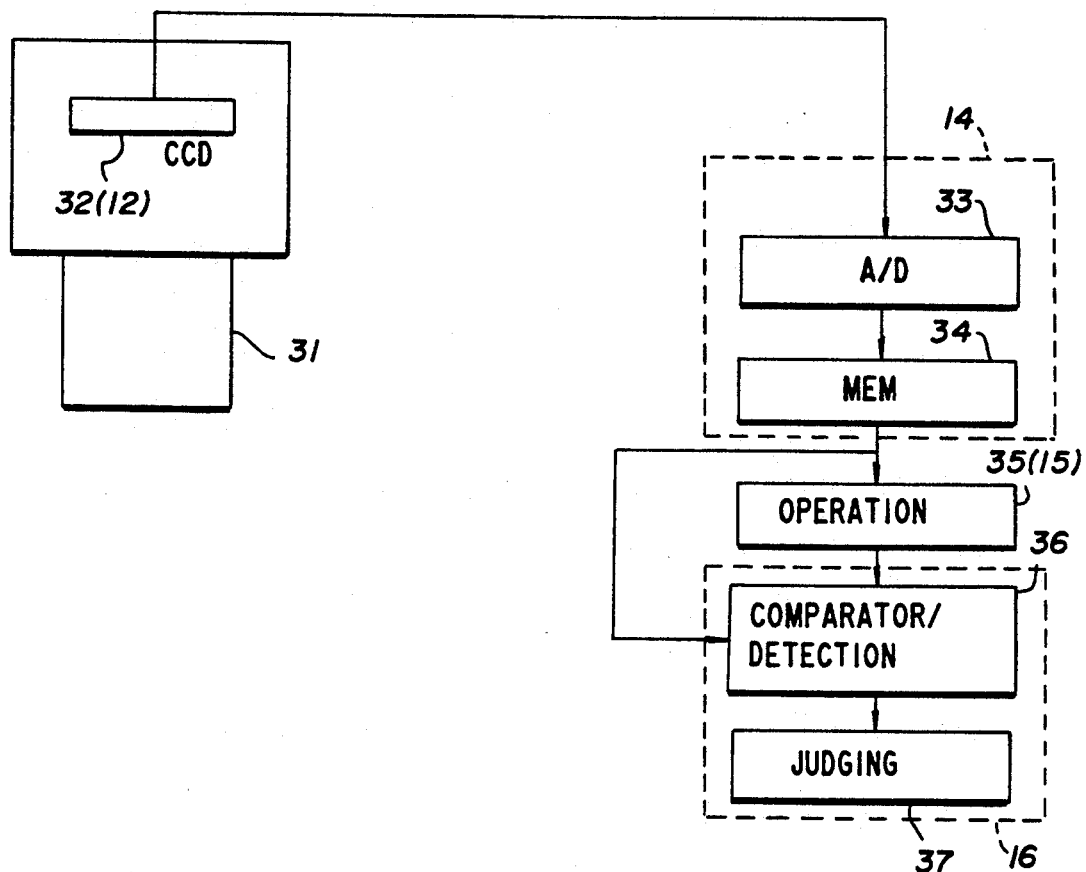
FIG. 7 is a system block diagram showing an essential part of a first embodiment of the bar code reading apparatus according to the present invention.

A description will be given of a first embodiment of the bar code reading apparatus according to the present invention, by referring to FIG. 7. In FIG. 7, those parts which are the same as those corresponding parts in FIGS. 5A and 5B are designated by the same reference numerals, and a description thereof will be omitted.

In FIG. 7, reflected light from the bar code (not shown) is received by a charge coupled device (CCD) driver 32 via a camera lens 31. The CCD driver 32 includes a CCD and forms the light receiving part 12 and outputs an electrical signal by subjecting the received reflected light to a photoelectric conversion.

Various standards have been set for the bar code. For example, in the case of CODE 39 or MIL-STD-1189, the bar code is made up of five bars and four spaces, where the width of three of the bars or the spaces is wide. A combination of a narrow bar and a narrow space describes a binary "0", and a combination of a wide bar and a wide space describes a binary "1". The combinations of the bars and spaces can thus describe various numbers, characters and the like. A start code is added to the start of the series of bars and spaces, and a stop code is added to the end of the series of bars and spaces. In addition, a code is added to the bar code to indicate the number of digits.

An output detection signal of the CCD driver 32 is supplied to an analog-to-digital (A/D) converter 33 and is converted into sampled data which are sampled at a constant sampling period by an A/D conversion. The sampled data are stored in a memory 34. The A/D converter 33 and the memory 34 form the sampling part 14. In this embodiment, the sampling period is set to a value such that a plurality of sampled data exist within an interval corresponding to the width of the narrow bar.

The sampled data read out from the memory 34 are supplied to an operation circuit 35 which forms the average value calculating part 15. The operation circuit 35 calculates the average value of the sampled data for every average value calculation interval as described above in conjunction with FIG. 6A. In this embodiment, the average value calculation interval is equal to the width of the narrow bar.

A comparator and detection circuit 36 compares the sampled data read out from the memory 34 with each average value obtained from the operation circuit 35, and detects the intersections of the waveforms of the two data as described above in conjunction with FIG. 6B. A judging circuit 37 reads an interval between each two adjacent intersections a width data related to the bar code. In other words, the comparator and detection circuit 36 and the judging circuit 37 form the operation part 16. The judging circuit 37 also obtains an average value of maximum and minimum values of the width data, and judges whether or not the detected bar (or space) is a narrow bar (or a narrow space). The bar or space is judged as being wider than the narrow bar or space when the width data is greater than the average value of the width data, and the logic value "1" is detected. On the other hand, the bar or space is judged as being the narrow bar or space when the width data is less than the average value of the width data, and the logic value "0" is detected.

In this embodiment, the bar code is read based on the average values which are obtained in each of the average value calculation intervals using hardware structure. Hence, even if the reflectivity of the background part of the printed bar code greatly varies, it is possible to accurately read the bar code at a high speed. Of course, the functions of the detecting part 17 may be added to the operation circuit 35 and the functions of the judging part 18 may be added to the comparator and detection circuit 36.

Figure 8:
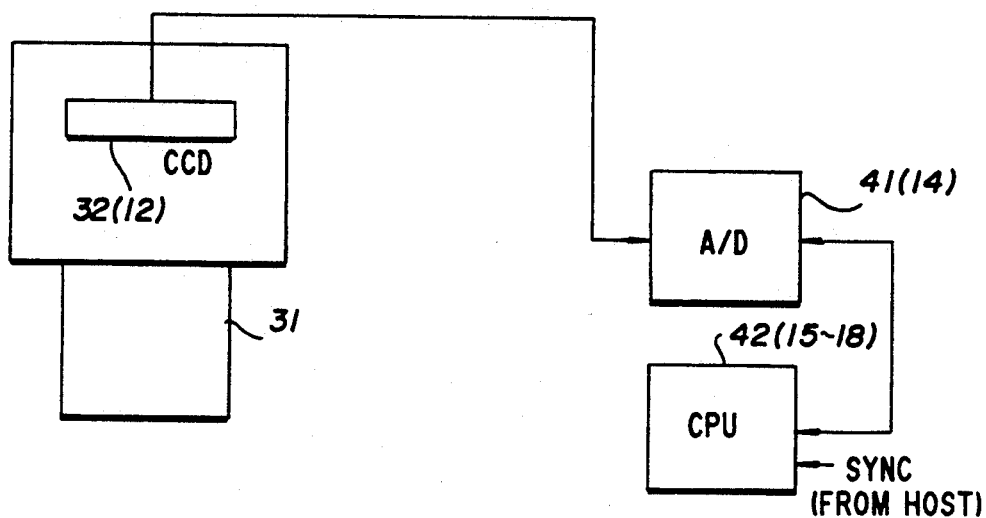
FIG. 8 is a system block diagram showing an essential part of a second embodiment of the bar code reading apparatus according to the present invention.

Next, a description will be given of a second embodiment of the bar code reading apparatus according to the present invention, by referring to FIG. 8. In FIG. 8, those parts which are the same as those corresponding parts in FIGS. 6A, 6B and 7 are designated by the same reference numerals, and a description thereof will be omitted.

In FIG. 8, the detection signal from the CCD driver 32 is supplied to an A/D converter memory board 41 wherein the sampling and the storage operations of the sampling part 14 are carried out. An output signal of the A/D converter memory board 41 is supplied to a central processing unit (CPU) board 42 wherein the operations of the average value calculating part 15, the operation part 16, the detecting part 17 and the judging part 18 are carried out by software to read the bar code.

Figure 9:
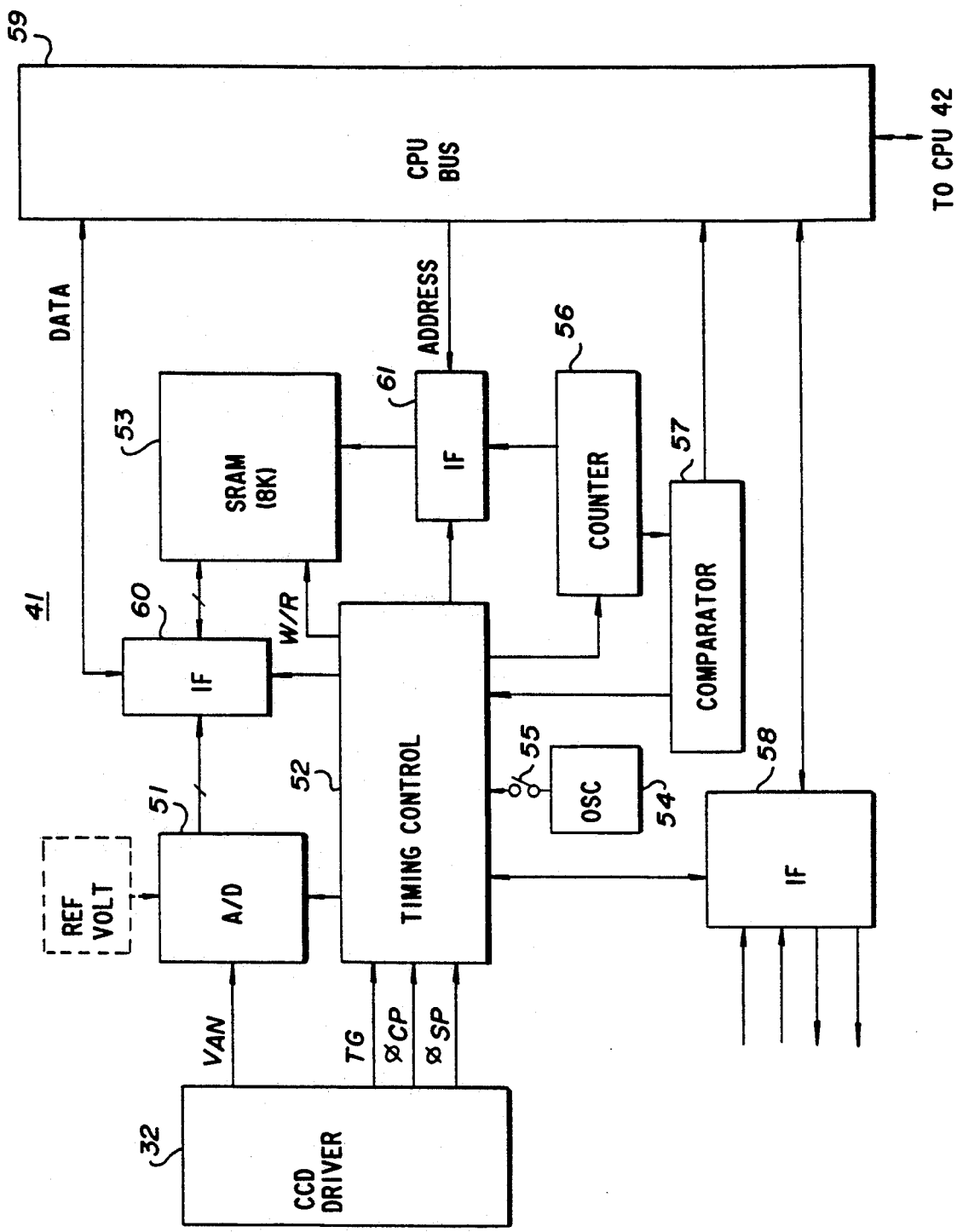
FIG. 9 is a system block diagram showing an embodiment of an A/D converter board shown in FIG. 8 together with a CCD driver.
Figure 10:
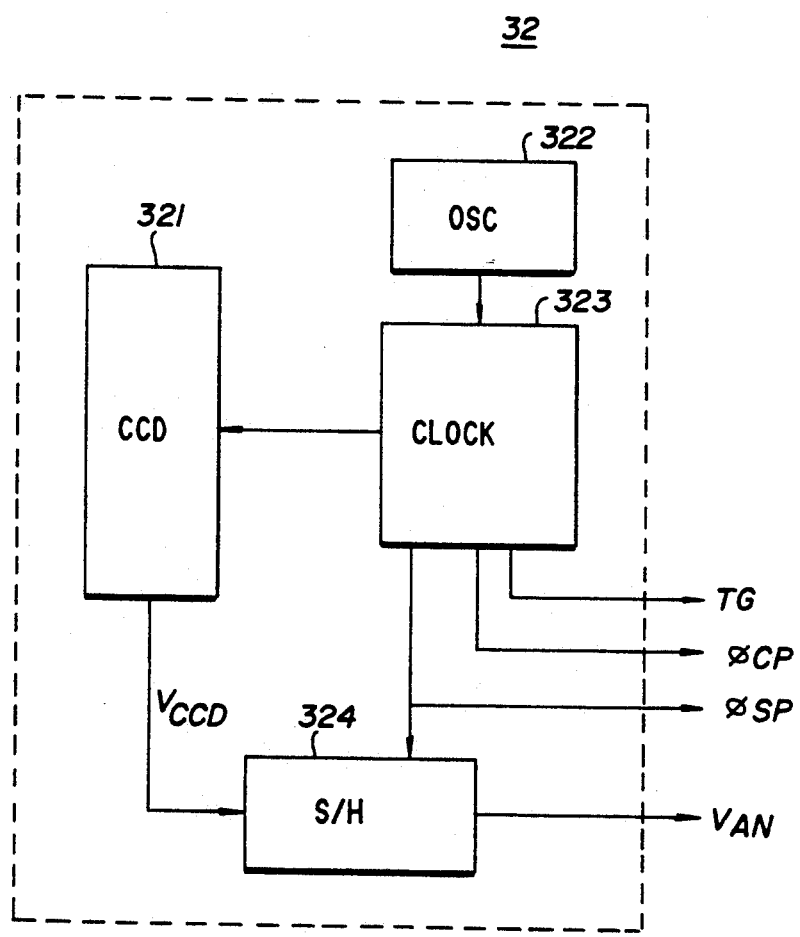
FIG. 10 is a system block diagram showing an embodiment of the CCD driver.

FIG. 9 shows an embodiment of a hardware structure of the A/D converter memory board 41 together with the CCD driver 32. FIG. 10 shows an embodiment of the CCD driver 32. The CCD driver 32 includes a CCD 321, an oscillator 322, a clock circuit 323 and a sample and hold (S/H) circuit 324 which are connected as shown in FIG. 10. The clock circuit 323 supplies a driving clock to the CCD 321 in response to an oscillation output of the oscillator 322, and the CCD 321 outputs a bar code detection signal $V_{CCD}$ in response to the driving clock. The bar code detection signal $V_{CCD}$ is supplied to the S/H circuit 324 and is sampled and held in response to a sampling clock $\phi_{sp}$ which is generated from the clock circuit 323. A sampled and held signal $V_{AN}$ is thus output from the S/H circuit 324 as a detection signal. The clock circuit 323 also outputs a periodical trigger signal TG and a clamp clock $\phi_{cp}$.

Figure 11:
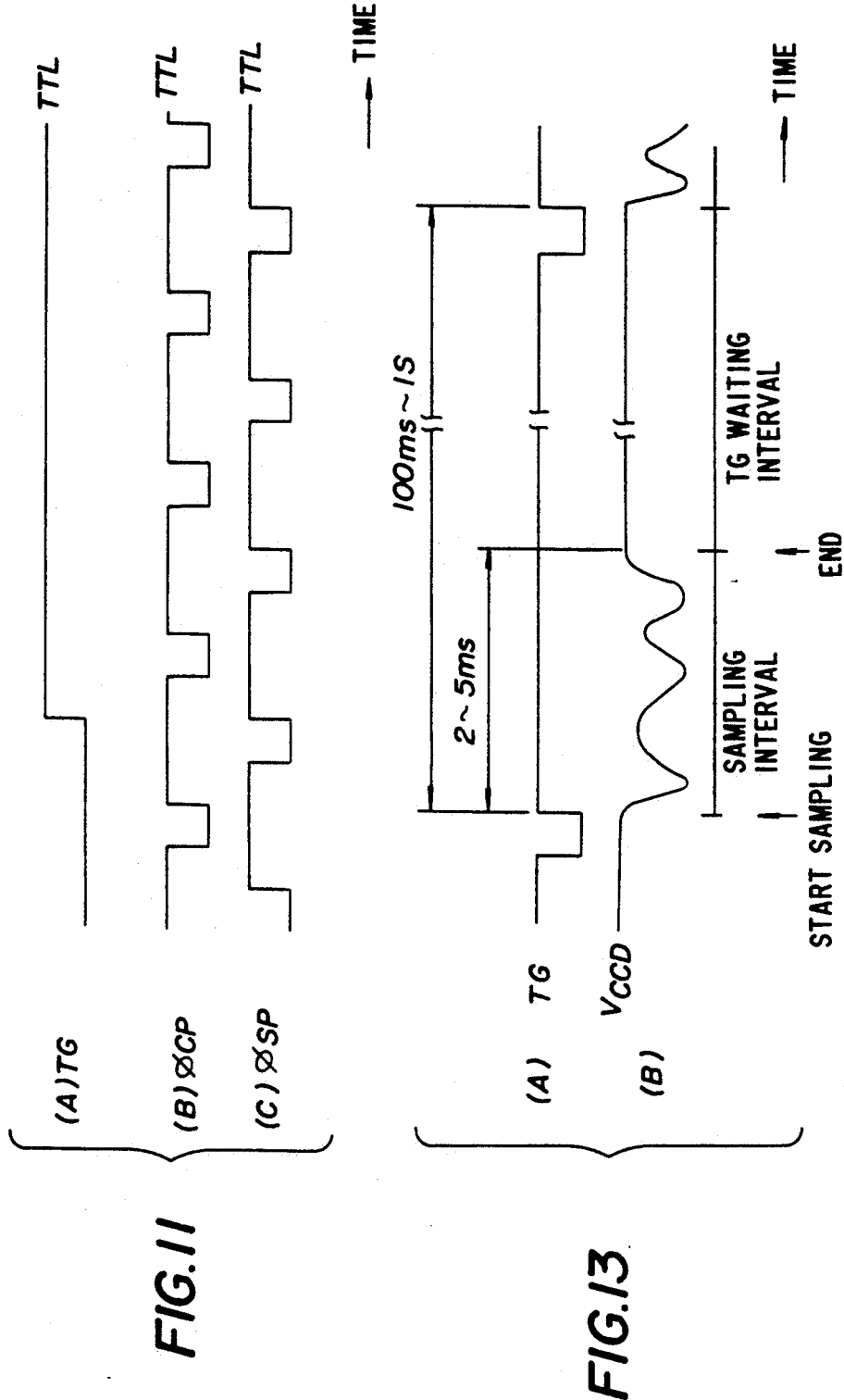
FIG. 11 is a time chart for explaining relationships of a trigger signal, a clamp clock and a sampling clock which are generated from a clock circuit of the CCD driver.

FIG. 11 shows the relationships of the trigger signal TG, the clamp clock $\phi_{cp}$ and the sampling clock $\phi_{sp}$ which are generated from the clock circuit 323. FIG. 11(A) shows the trigger signal TG, FIG. 11(B) shows the clamp clock $\phi_{cp}$ and FIG. 11(C) shows the sampling clock $\phi_{sp}$.

Figure 12:
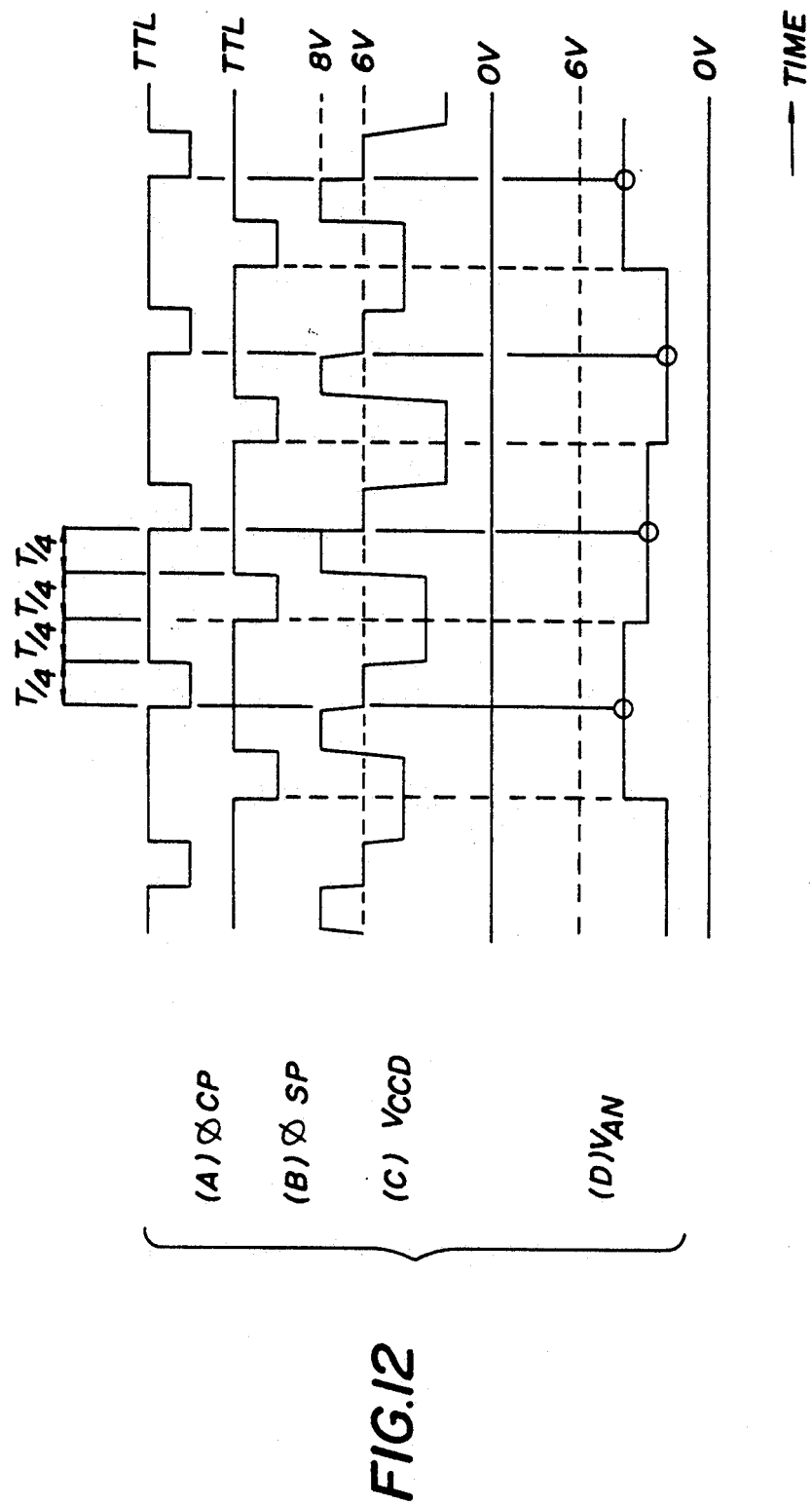
FIG. 12 is a time chart for explaining relationships of the clamp clock, the sampling clock, a bar code detection signal which is output from a CCD and a detection signal which is output from a S/H circuit of the CCD driver.

On the other hand, FIG. 12 shows the relationship of the clamp clock $\phi_{cp}$, the sampling clock $\phi_{sp}$, the bar code detection signal $V_{CCD}$ and the detection signal $V_{AN}$. FIG. 12(A) shows the clamp clock $\phi_{cp}$, FIG. 12(B) shows the sampling clock $\phi_{sp}$, FIG. 12(C) shows the bar code detection signal $V_{CCD}$ and FIG. 12(D) shows the detection signal $V_{AN}$. In FIG. 12(D), a circular mark is used to indicate the A/C conversion level. For example, an interval T satisfies $1 \mu s \leq T < 10 \mu s$.

In FIG. 9, an A/D converter 51 converts the detection signal $V_{AN}$ from the CCD driver 32 into sampled data based on a sampling clock from a timing control circuit 52. The timing control circuit 52 generates various timing and control pulses based on the trigger signal TG, the clamp clock $\phi_{cp}$ and the sampling clock $\phi_{sp}$ which are received from the CCD driver 32. A static random access memory (SRAM) 53 writes the sampled data from the A/D converter 51 based on a control signal from the timing control circuit 52, and the stored sampled data are read out from the SRAM 53 based on a control signal from the timing control circuit 52.

An oscillator 54 supplies a clock to the timing control circuit 52 via a switch 55. A binary counter 56 counts the clamp clock $\phi_{cp}$ or the sampling clock $\phi_{sp}$ from the timing control circuit 52. A comparator 57 outputs a detection signal when when the count in the binary counter 56 reaches a predetermined value, and this detection signal is supplied to the timing control circuit 52 so as to stop the supply of the sampling clock to the A/D converter 51. A peripheral interface 58 is coupled to a CPU bus 59 which couples the A/D converter memory board 41 to the CPU board 42. The peripheral interface 58 couples the A/D converter memory board 41 to peripheral devices. Interfaces 60 and 61 are also coupled to the CPU bus 59.

Next, a description will be given of an operation of the A/D converter memory board 41. As shown in FIG. 13(A), the trigger signal TG has a period on the order of 100 ms to 1 s. When this trigger signal TG is supplied to the timing control circuit 52, the timing control circuit 52 supplies the sampling clock to the A/D converter 51 from a time when a rising edge of the trigger signal TG is detected, in synchronism with the clamp clock $\phi_{cp}$ and the sampling clock $\phi_{sp}$. Hence, the sampling of the detection signal $V_{AN}$ is started as shown in FIG. 13(B). The sampled data output from the A/D converter 51 are successively stored in the SRAM 53.

After the sampling of the A/D converter 51 starts and the binary counter 56 counts 2000 to 8000 pulses of the clamp clock $\phi_{cp}$ or the sampling clock $\phi_{sp}$, that is, after 2 to 5 ms elapses after the sampling of the A/D converter 51 starts, the timing control circuit 52 stops the supply of the sampling clock to the A/D converter 51 based on the output of the comparator 57. Hence, the A/D converter 51 stops the sampling of the detection signal $V_{AN}$. In addition, the comparator 57 notifies the end of the sampling to the CPU board 42 via the CPU bus 59.

Next, a description will be given of an operation of the CPU board 42. The CPU board 42 has a known construction including a CPU, a read only memory (ROM) and a RAM, for example. The ROM stores programs for carrying out various operations on the CPU, and various data are stored in the RAM.

Figure 14:
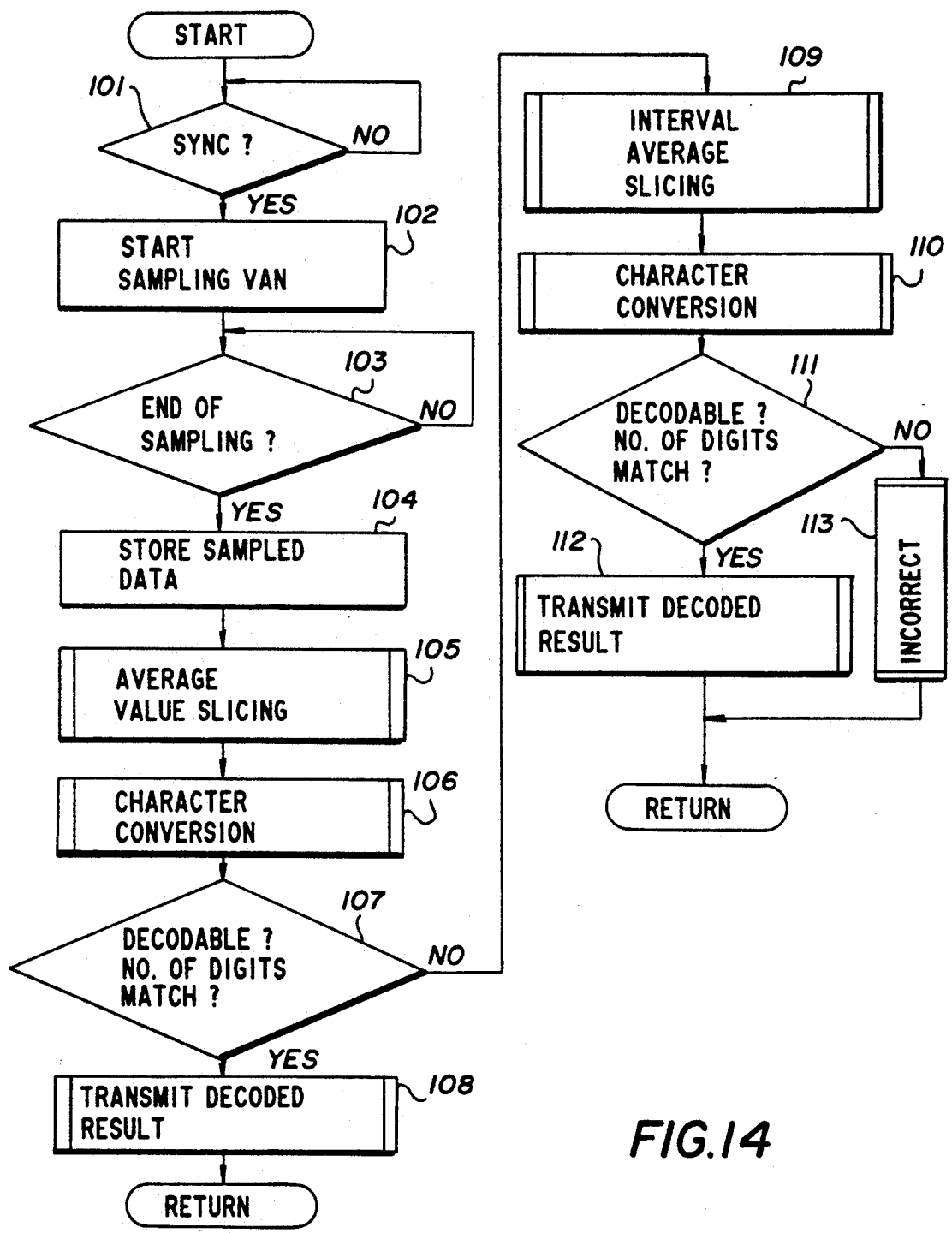
FIG. 14 is a flow chart showing an embodiment of an operation of a CPU of a CPU board.

FIG. 14 is a flow chart showing an embodiment of an operation of the CPU of the CPU board 42. A step 101 judges whether or not an instruction signal SYNC is received from a system of a higher order, such as a host computer. When the judgement result in the step 101 becomes YES, a step 102 starts the sampling of the detection signal $V_{AN}$ from a time when the trigger signal TG is supplied to the A/D converter memory board 41. Then, a step 103 judges whether or not an end of the sampling is notified from the A/D converter memory board 41. When the judgement result in the step 103 becomes YES, a step 104 controls the read out from the SRAM 53 and stores all sampled data $X_0$ through $X_{n-1}$ into the RAM of the CPU board 42.

Figure 15:
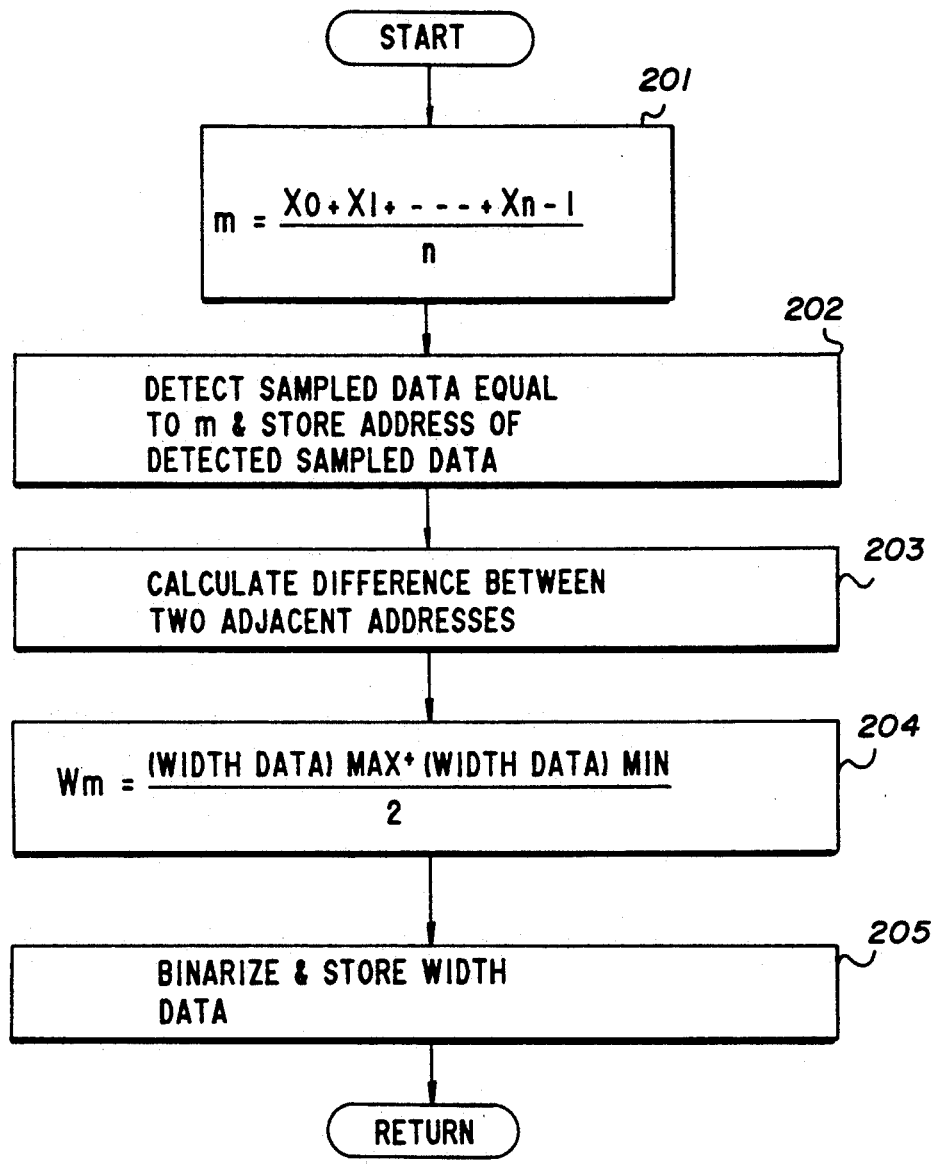
FIG. 15 is a flow chart showing an embodiment of a subroutine for carrying out an average value slicing.

A step 105 carries out an average value slicing after the step 104. FIG. 15 is a flow chart showing an embodiment of a subroutine for carrying out the average value slicing. In FIG. 15, a step 201 calculates an average value m of all the sampled data $X_0$ through $X_{n-1}$ which are read out from the RAM of the CPU board 42. A step 202 detects those ones of the sampled data $X_0$ through $X_{n-1}$ having the same value as the average value m which is used as a reference value, and stores the address of each detected sampled data in a separate area of the RAM. The address of the detected sampled data indicates the sampling position.

Then, a step 203 calculates a difference between each two adjacent addresses in the separate area of the RAM and regards each calculated difference as a width data. A step 204 calculates an average width data $W_m$ by dividing a sum of a maximum value and a minimum value of the width data by two. Finally, in a step 205 the width data are binarized by regarding each width data which is smaller than the average width data $W_m$ as a narrow bar ("0") and regarding each width data which is greater than or equal to the average width data $W_m$ as a wide bar ("1"), that is, a bar which is wider than the narrow bar. The step 205 also stores the binarized results into the RAM, and the subroutine ends.

The step 105 shown in FIG. 14, that is, the process shown in FIG. 15, corresponds to the process carried out by the detecting part 17 which reads the bar code according to the first conventional method. Hence, in this embodiment, the bar code is first read by the first conventional method.

Figure 16:
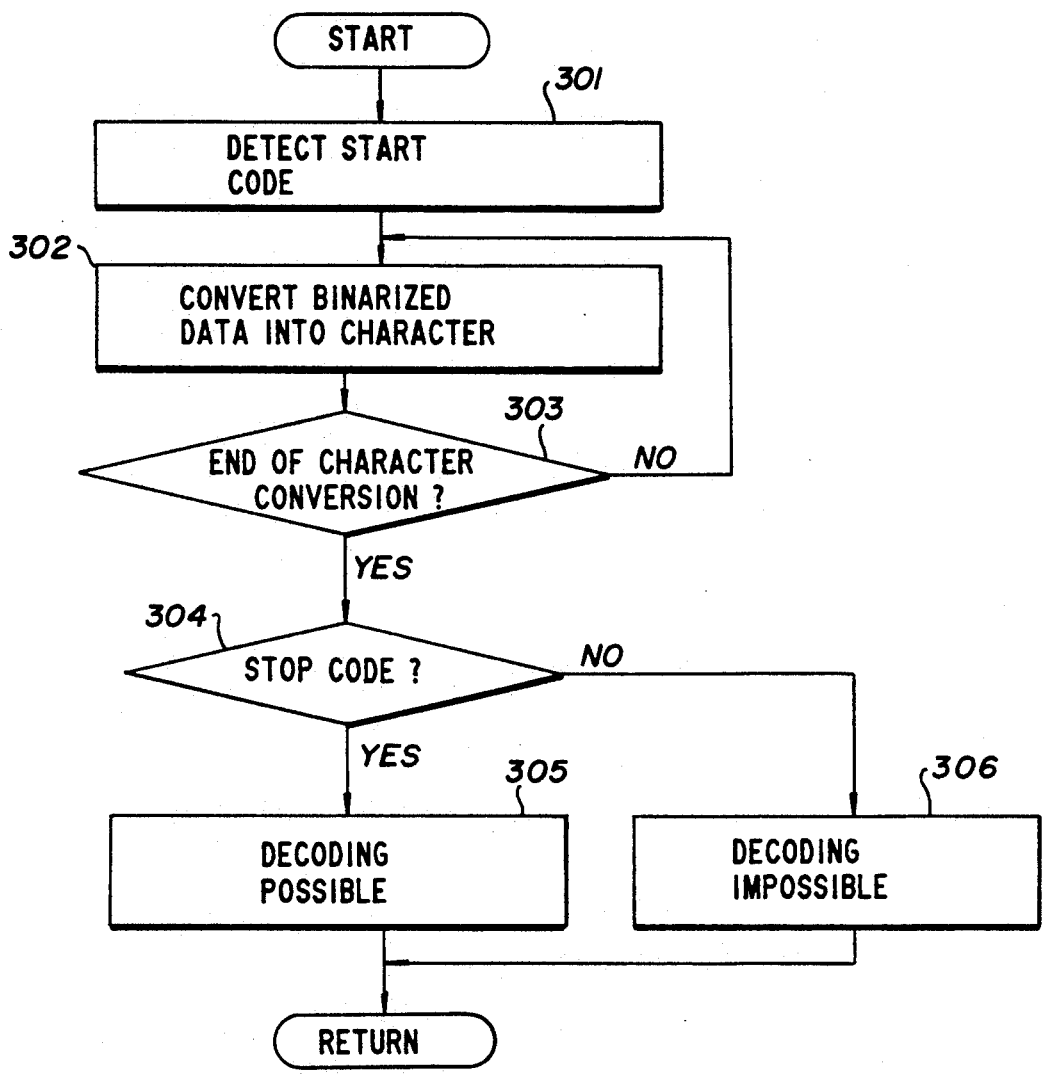
FIG. 16 is a flow chart showing an embodiment of a subroutine for carrying out a character conversion.

Next, a step 106 carries out a character conversion after the step 105. FIG. 16 is a flow chart showing an embodiment of a subroutine for carrying out the character conversion. In FIG. 16, a step 301 detects a start code from the binarized data stored in the RAM of the CPU board 42. The start code, the stop code, and the relationships of the binarized data and the characters are predetermined as described above. In other words, the ROM of the CPU board 42 prestores the relationship of the binarized data and the corresponding characters described thereby in the form of a code table, for example. Hence, the character conversion can be carried out by referring to the code table when the bar code is decoded into the binarized data.

When the start code is detected, a step 302 converts the binarized data which follow immediately after the start code into characters, one character at a time. A step 303 judges whether or not the character conversion is ended for all the binarized data. The process returns to the step 302 when the judgement result in the step 303 is NO. On the other hand, when the judgement result in the step 303 is YES, a step 304 judges whether or not a stop code exists. When the judgement result in the step 304 is YES, a step 305 notifies the CPU (that is, a main program) of the CPU board 42 that the decoding is possible and the subroutine ends. But when the judgement result in the step 304 is NO, a step 306 notifies the CPU (that is, the main program) of the CPU board 42 that the decoding is impossible and the subroutine ends.

When the character conversion of the step 106 ends, a step 107 judges whether or not the bar code can be decoded based on the result obtained in the step 305 or 306, and also based on whether or not a code value within the binarized data indicating the number of digits matches the number of digits of the characters. When the judgement result in the step 107 is YES, a step 108 judges that the bar code is correctly decoded and the decoded result (for example, characters or the like) is transmitted to the host computer.

On the other hand, if the step 107 judges that the decoding is impossible and/or the number of digits do not match, the judgement result in the step 107 becomes NO. In this case, the process advances to a step 109 so as to carry out an interval average slicing.

The step 107 and the steps 304 through 306 correspond to the judging part 18.

Figure 17:
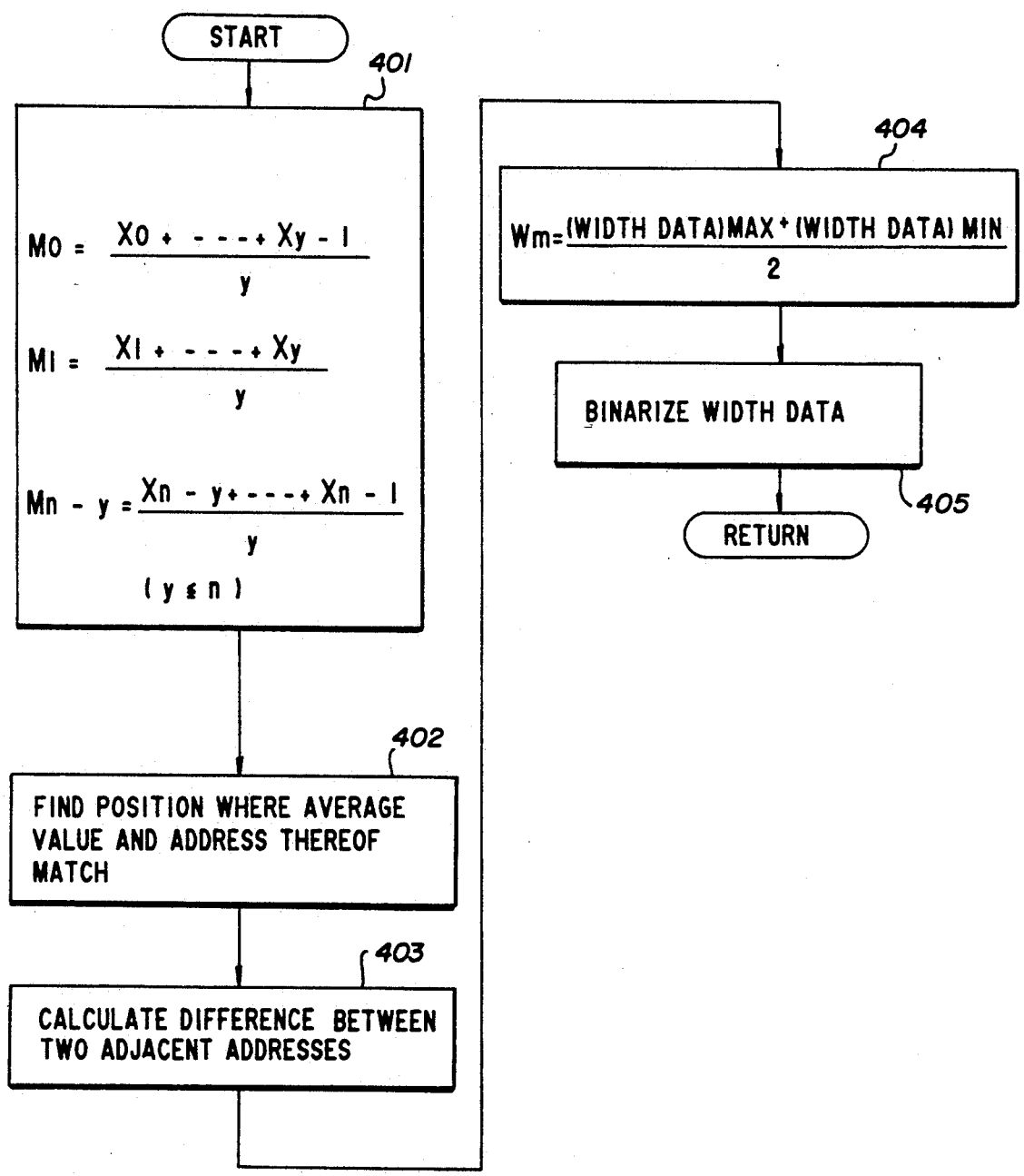
FIG. 17 is a flow chart showing an embodiment of a subroutine for carrying out an interval average slicing.

FIG. 17 is a flow chart showing an embodiment of a subroutine for carrying out the interval average slicing, and this process corresponds to the average value calculating part 15.

In FIG. 17, a step 401 reads all of the sampled data $X_0$ through $X_{n-1}$ from the RAM of the CPU board 42 again from respective addresses $Y_0$ through $Y_{n-1}$, and calculates an average value of the sampled data for each average value calculation interval, that is, for each address interval y. In addition, the step 401 stores each calculated average value in a separate area of the RAM together with an address of a center of the corresponding interval in which this average value is calculated.

In other words, a first average value $M_0$ is calculated by dividing a sum of first y sampled data $X_0$ through $X_{y-1}$ by the average value calculation interval y. Then, a second average value $M_1$ is calculated by dividing a sum of second y sampled data $X_1$ through $X_y$ by the average value calculation interval y. The sampled data are shifted by one sample similarly thereafter when calculating the average values, and the calculation and storage of the average values are carried out up to the $(n-y+1)$th average value $M_{n-y}$. In this case, corresponding addresses of the average values $M_0, M_1, \ldots, M_{n-y}$ respectively are $Y_{y/2}, Y_{y/2+1}, \ldots, Y_{y/2+n}$.

Next, a step 402 finds from the sampled data each position where the average value and the address thereof match, and stores the address of each position into the RAM. Then, a step 403 calculates a difference between each two adjacent stored addresses in the RAM and regards each difference as width data. A step 404 calculates an average value $W_m$ of the width data by dividing a sum of a maximum value and a minimum value of the width data by two. A step 405 regards the width data which is smaller than the average value $W_m$ as a narrow bar or "0", and regards the width data which is greater than or equal to the average value $W_m$ as a wide bar (or space). The step 405 binarizes the width data in this manner and stores the binarized data into the RAM.

After the process shown in FIG. 17 is carried out, steps 110 and 111 shown in FIG. 14 are carried out. These steps 110 and 111 respectively carry out processes similar to the steps 106 and 107. When the judgement result in the step 111 is YES, a step 112 judges that the bar code is correctly decoded and the decoded result (for example, characters or the like) is transmitted to the host computer. On the other hand, if the step 111 judges that the decoding is impossible and/or the number of digits do not match, the judgement result in the step 111 becomes NO. In this case, the process advances to a step 113 which notifies the host computer that at least one of the decoding and the number of digits is incorrect.

According to this embodiment, the bar code is first read by the first conventional method, and the method of the present invention is employed only when an abnormality is detected during the reading of the bar code by the first conventional method. For this reason, it is possible to read and decode the bar code within a short time regardless of whether or not the reflectivity of the background part of the bar code greatly varies.

Further, the present invention is not limited to these embodiments, but various variations and modifications may be made without departing from the scope of the present invention.

What is claimed is:

1. A bar code reading apparatus comprising:

a light source for illuminating a bar code, said bar code including a combination of bars and spaces;

light receiving means, including means for receiving reflected light from the bar code and means for subjecting the received reflected light to a photoelectric conversion to output an electrical signal; and decoding means, coupled to said light receiving means, for decoding the bar code by reading width data related to widths of the bars and spaces of the bar code based on the electrical signal from said light receiving means, said decoding means including:

sampling means, coupled to said light receiving means, for sampling the electrical signal from said light receiving means with a predetermined period and for outputting sampled data, calculating means, coupled to said sampling means, for calculating an average value of the sampled data for every predetermined interval, said predetermined interval being greater than a maximum width of a noise which is detectable from the electrical signal, and operation means, coupled to said calculating means, for obtaining intersecting points where a waveform connecting the sampled data and a waveform connecting the average values intersect, and for reading a width of each bar and space within the bar code based on an interval between each two adjacent intersecting points.

2. The bar code reading apparatus as claimed in claim 1, wherein said calculating means successively repeats an operation of calculating an average value of the sampled data within a first predetermined interval and a center of the first predetermined interval, and calculating an average of the sampled data within a second predetermined interval and a center of the second predetermined interval, said second predetermined interval being shifted by one sampled data from the first predetermined interval so that all sampled data within the first predetermined interval except a first sampled data are included within the second predetermined interval.

3. The bar code reading apparatus as claimed in claim 1, wherein said sampling means includes an analog-to-digital converter, coupled to said light receiving means, for subjecting the electrical signal to an analog-to-digital conversion so as to output the sampled data, and a memory, coupled to said analog-to-digital converter, for temporarily storing the sampled data.

4. The bar code reading apparatus as claimed in claim 3, wherein said operation means includes a first circuit, coupled to said memory, for obtaining the intersecting points where the waveform connecting the sampled data read out from said memory and the waveform connecting the average values intersect, and a second circuit, coupled to said first circuit, for reading the width of each bar and space within the bar code based on the interval between each two adjacent intersecting points.

5. The bar code reading apparatus as claimed in claim 1, wherein said predetermined interval is set equal to a minimum width of the bar within the bar code.

6. The bar code reading apparatus as claimed in claim 1, wherein said decoding means further includes detecting means, coupled to said sampling means, for calculating an average value of all of the sampled data from said sampling means as a reference value and for detecting the width of each bar and space within the bar code based on an interval between two adjacent sampled data which match the reference value, and judging means, coupled to said detecting means, for judging whether or not correct conversion of the widths detected by said detecting means into character information is possible, said judging means activating said calculating means only when a correct conversion of the widths into the character information is impossible.

* * * * *